United States Patent [19]

Noguchi et al.

[11] Patent Number: 6,071,646
[45] Date of Patent: Jun. 6, 2000

[54] SPINEL COMPOUNDS AS CATHODES FOR LITHIUM MATERIALS

[75] Inventors: Hideyuki Noguchi, Saga-Pref.; Hiroyuki Tabata; Noriko Anan, both of Fukuoka-Pref., all of Japan

[73] Assignee: Kyushu Ceramics Industry Co., Ltd., Fukuoka-Pref., Japan

[21] Appl. No.: 08/920,104

[22] Filed: Aug. 26, 1997

[51] Int. Cl.[7] .............................. H01M 4/04; H01M 4/08; H01M 4/12
[52] U.S. Cl. ........................ 429/224; 429/231.95
[58] Field of Search .............................. 429/224; 423/599

[56] References Cited

U.S. PATENT DOCUMENTS

| | | | |
|---|---|---|---|
| 5,506,078 | 4/1996 | Davidson et al. | 429/224 |
| 5,629,112 | 5/1997 | Davidson et al. | 429/224 |
| 5,700,442 | 12/1997 | Bloch et al. | 423/599 |
| 5,753,202 | 5/1998 | Wang et al. | 423/599 |
| 5,770,018 | 6/1998 | Saidi | 204/157.15 |
| 5,792,442 | 8/1998 | Manev et al. | 423/599 |
| 5,807,646 | 9/1998 | Iwata et al. | 429/224 |

FOREIGN PATENT DOCUMENTS 10261416   9/1998   Japan ............................. H01M 4/58

OTHER PUBLICATIONS

Thackeray et al., J. Electrochem. Soc., 139, 1992, 363–366, Feb. 15, 1992.

*Primary Examiner*—Maria Nuzzolillo
*Assistant Examiner*—Mark Ruthkosky
*Attorney, Agent, or Firm*—Jordan and Hamburg LLP

[57] ABSTRACT

The invention relates to a method of preparing spinel structure lithium manganese oxides as cathode for lithium batteries. The spinel compounds are obtained by the reacting of $MnO_2$ with a particle size of less 10 $\mu$m and $Li_2CO_3$. The cell containing above cathode material provides improved capacity and good rechargeability. The method described in the present invention is much closer to industrial scale produce.

4 Claims, 1 Drawing Sheet

SPINEL COMPOUNDS AS CATHODES FOR LITHIUM MATERIALS

BACKGROUND OF THE INVENTION

Spinel compound has been demonstrated to be a most promising cathode material for lithium ion batteries among these candidates, e.g., $LiCoO_2$, $LiNiO_2$, and $Li_xMn_2O_4$, since $Li_xMn_2O_4$ offers several advantages in term of low cost, easy preparation and no toxicity. The common preparation method was first described by Hunter. The compound was prepared from a solid state reaction of $LiCO_3$ and $Mn_2O_3$ or $Mn_3O_4$ in the Li/Mn molar ratio of ½ in air at 600°–650° C., followed by heating it at 800°–900° C. in air. However, the resulting compounds prepared by this method exhibited low capacity and poor reversibility. A marked improvement in preparation of spinel $Li_xMn_2O_4$ with a large capacity was achieved by reacting stoichiometric amounts of $Li_2CO_3$ and $MnO_2$ in air with three consecutive annealing steps at 800° C. (each for 24 h), and then further grinding to obtained spinel with the particles of about 1–2 $\mu$m (U.S. Pat. No. 5,192,629). Although this technique can be carried out in air, it is too complex to apply for industrial production. More recently, a simple and cheap process route for synthesizing a spinel Li—Mn—C) compound was of a melt-impregnation method suggested by M. Yoshio. This involved a direct synthesis by a reaction of $LiNO_3$ or LiOH with $MnO_2$. One of the advantages of the compounds produced by this method is application of a lower final heating temperature, which will cause rather higher surface area of the resulting compounds. However, $LiNO_3$ easily adsorbs water, thus is difficult to control the required composition of Li/Mn, also the gas $NO_x$ produced will pollute the environment. LiOH will adsorb the $CO_2$ in air. From a manufacturing viewpoint, it is unlikely that $LiNO_3$ (cost, toxic emission) or LiOH (cost, reaction with $CO_2$) are viable candidates for $LiMn_2O_4$ preparations. It would be welcome to develop a cheap and easy synthesis to produce the spinel electrode material in industrial scale using $Li_2CO_3$ as lithium source.

SUMMARY OF THE INVENTION

The invention relates to a synthesis method of spinel electrode materials obtained from electrochemically prepared manganese dioxide (EMD) and lithium carbonate. In particular, using EMD with particles of less than 10 $\mu$m improves in homogeneous distribution of lithium salt and $MnO_2$. This overcomes the possibility of forming coproducts, such as $LiMnO_2$, $Mn_2O_3$, and $LiMnO_3$, etc, due to an ununiform mixing compared with the common EMD for alkaline battery (average particle of 40 $\mu$m).

In another aspect of the invention, the stoichiometric mixture was preheated to about 600° C., i.e. the melting point of $Li_2CO_3$. During this process, $Li_2CO_3$ was melted and accompanied by a reaction with $MnO_2$ to form defect spinel. This also played a blocking effect in forming coproducts mentioned above.

DESCRIPTION OF THE PREPARED EMBODIMENTS

Figure 1:
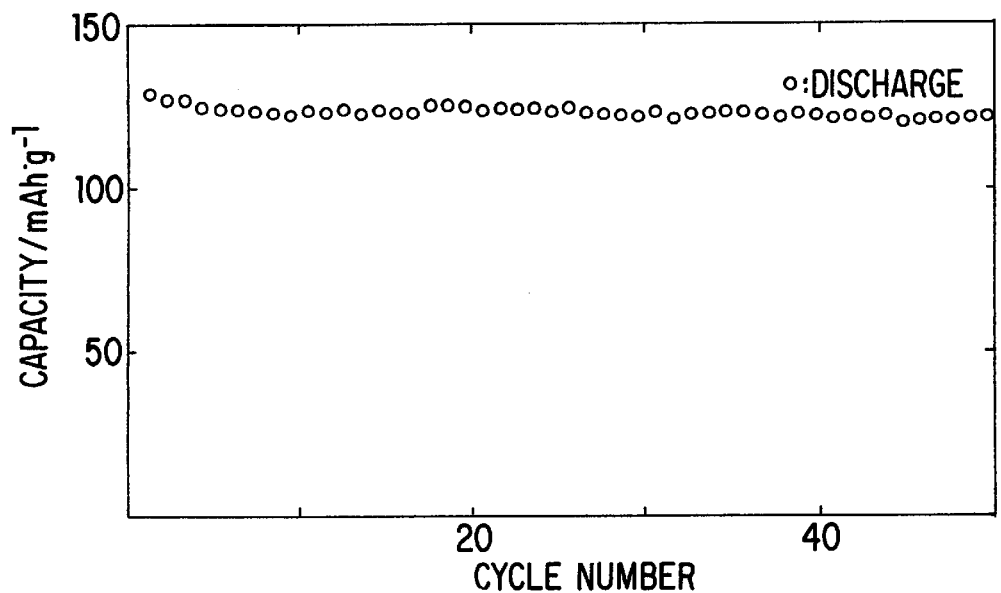
FIG. 1 displays cycle life test of a Li/1M $LiPF_6$-EC/DMC/$Li_xMn_2O_4$ cell containing an optimum spinel electrode material.

The present invention is based on development in a synthesis method to prepare an optimum spinel structure cathode material with a large capacity and good rechargeability. In particular, an EMD with the particle size of less than 10 $\mu$m was selected as a manganese sources. The improvement produced by the use of such particle manganese dioxides is to increase the homogeneoutity of distribution in EMD and $Li_2CO_3$ compared with common EMD (average particle size of 40 $\mu$m). Thus plays a critical blocking role in formation of coproducts, such as $Mn_2O_3$ and $Li_2MnO_3$ due to lack of lithium or excess of lithium which are commonly caused by an inhomogeneous distribution of Li and Mn. When a common EMD is used, it is more difficult to obtain a homogeneous mixture. One way to overcome it, as suggested by Guyomard, is to grind repeatedly the heated products. However, this process requires too much time. The synthesis method described in the present invention is much closer to industrial practice.

The reaction of $MnO_2$ with $Li_2CO_3$ to form oxygen-rich spinel could occur at about 400° C., however, it will take a long time to completely form oxygen-rich spinel. If the heating temperature is raised to the melting-point of $Li_2CO_3$ (600–650° C.), $Li_2CO_3$ will melt and coat on the surface of $MnO_2$, thereby the distribution of Li and Mn is much more homogeneous and the reaction becomes a solid-solution phase, the synthesis process is more reproduceable, and it is possible to form spinel within 10 h. The analysis of XRD patterns of the above compound obtained by heating the stoichiometric mixture of $LiCO_3$ and $MnO_2$ at 600–650° C. for 10 h shows that only a single phase oxygen-rich spinel was formed and no peaks with the evidence of $Li_2MnO_3$ and $Mn_2O_3$ was observed. For the above oxygen-rich spinel, it normally has a slightly low capacity and a small lattice parameter of less 8.2 Å. In order to obtain the desirable spinel, these oxygen-rich spinels are further heated at 700–750° C. Thus, an optimum spinel cathode material can be obtained according to the present invention.

EXAMPLE 1

20 g of electrochemically prepared manganese dioxide (EMD) with a particle size of less than 10 $\mu$m was thoroughly mixed with 4.2434 g of $Li_2CO_3$ (0.524 in Li/Mn molar ratio). The above mixture was heated at 600° C. with a heating rate of 100° C./h. and held at 600° C. in air for 10 h, cooled in 1 h in air. The resulting compound was then subjected to X-ray diffraction measurement to confirm whether $Mn_2O_3$ and $Li_2MnO_3$ phases exist. The XRD patterns of the above compound shows no peaks with the evidence of $Mn_2O_3$ and $Li_2MnO_3$, suggesting that a single phase oxygen-rich spinel was formed. The calculated cubic lattice parameter is 8.19 Å.

To reduce the oxygen content in the above compound, the oxygen-rich spinel was further heated at 750° C. for 24 h in air. The lattice parameter of the resulting compound is increased to 8.22 Å. The electrochemical behavior test of the above spinel in the present invention as a cathode material for lithium batteries was examined on a laboratory cell. The cell consisted of a cathode and a lithium metal anode separated by a porous polypropylene film. Metallic lithium was in excess. The mixture, comprising 25 mg active material and 10 mg conducting binder, was pressed on a 2.5 $cm^2$ stainless screen at 800 $kg/cm^2$, and assembled as a cathode in the above cell. The used electrolyte was 1M $LiPF_6$-EC/DMC (1:2 in volume). Cells were usually cycled between 3.5 and 4.5 V; the charge and discharge rate examined was 0.4 $mA/cm^2$ (C/3), unless specially noted. All assembles were carried out in a dry box filled with argon gas.

Specific capacity of a Li/$LiMn_2O_4$ cells containing the above spinel cathode is plotted in FIG. 1 as a function of cycle number. The spinel electrode material in the present invention has an initial specific capacity of 129 mAh/g, and mains a specific capacity of 122 mAh/g over 50 cycles.

Comparative Example 1

EMD with average particle size of 40 μm was used as a manganese source. The synthesis conditions were the same as that described in Example 1. The XRD analysis showed peaks shared with the characteristic of $Mn_2O_3$ appeared in the sample which was obtained at 600° C. This cathode material has an initial specific capacity of 90 mAh/g. When the above sample was ground and heated again in air at 750° C. for 24 h, the peaks of $Mn_2O_3$ disappeared in the XRD pattern. The initial capacity was increased to 120 mAh/g.

Comparative Example 2

The effect of Li/Mn molar ratio in the starting material on the chemical composition of the heated products was also examined in the present invention between 0.50 and 0.54. The examined conditions were the same as described in the Example 1. When the Li/Mn molar ratio is 0.5, the co-product $Mn_2O_3$ was conformed by XRD analysis, as well as $LiMn_2O_3$ was formed when Li/Mn molar ratio exceed to 0.53. Considering all the above, the desirable molar ratio of Li to Mn for preparing single phase $Li_xMn_2O_4$ are in the range from 0.51 to 0.53 in the present invention.

EXAMPLE 2

20 g of electrochemically prepared manganese dioxide (EMD) with a particle size of less 10 μm was thoroughly mixed with 4.2434 g of $Li_2CO_3$ (0.524 in Li/Mn molar ratio). The above mixture was heated to 600° C. with a heating rate of 100° C./min. and held at 600° C. in air for 10 h. The heating temperature was then raised to 750° C. in 1 h, followed by heating it at 750° C. for 24 h in air. X-ray diffraction pattern of the sample is only characteristic of a spinel phase. The calculated lattice parameter is also 8.22 Å which is the same as that of the sample in Example 1.

Figure 2:
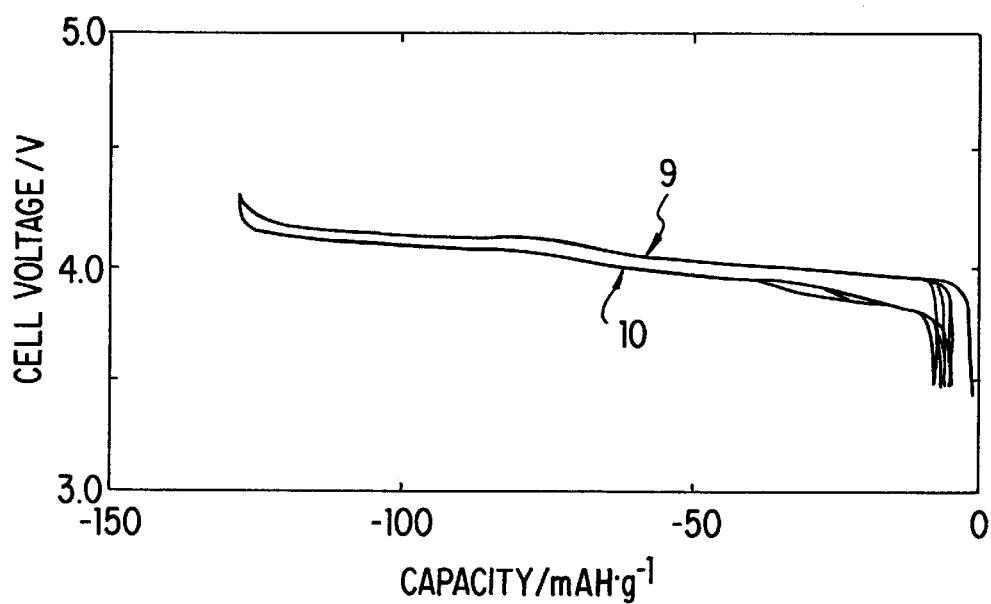
FIG. 2 displays the consecutive change/discharge curves of a Li/$Li_xMn_2O_4$ cell containing an optimum spinel electrode material.

FIG. 2 shows the consecutive charge/discharge curves of $Li/Li_xMn_2O_4$ cell based on the above spinel cathode. The shapes of charge and discharge curve are the same as these of sample in the Example 1 in the present invention. This cathode material has a slightly low capacity of 124 mAh/g compared with the sample in Example 1.

What is claimed is:

1. A method for preparing a spinel structure lithium manganese oxide as a cathode for lithium batteries, said structure having the formula $Li_xMn_2O_4$ wherein the value of "x" is such that the molar ratio of Li/Mn is 0.51 to 0.53, consisting essentially of reacting electrochemically prepared manganese dioxide (EMD) and lithium carbonate ($Li_2CO_3$) by first preheating a stoichiometric mixture of EMD and $Li_2CO_3$ in air at 600–650° C. for a period of time to form an oxygen-rich spinel having an XRD pattern with no peaks indicating the presence of $Li_2MnO_3$ or $Mn_2O_3$, followed by heating it in air at 700–750° C. to obtain the final spinel.

2. The method of claim 1 wherein said EMD has a particle size of less than 10 μm.

3. The method of claim 1 wherein said preheating in air at 600° C.–650° C. is continued for at least 10 hours.

4. The method of claim 1 wherein said heating in air at 700–750° C. is continued for a period sufficient to increase substantially the capacity and lattice parameter of said spinel, said lattice parameter defining the length of an edge of a cell of the crystal lattice of said spinel.

* * * * *